UNITED STATES PATENT OFFICE.

JOSEF MESSINGER AND GEORG VORTMANN, OF AIX-LA-CHAPELLE, AND HERMANN JANSSEN, OF ELBERFELD, ASSIGNORS TO THE FARBENFABRIKEN, VORMALS FR. BAYER & CO., OF ELBERFELD, GERMANY.

COMPOUND OF CRESOL, &c.

SPECIFICATION forming part of Letters Patent No. 495,204, dated April 11, 1893.

Application filed June 5, 1891. Serial No. 395,252. (Specimens.) Patented in Germany November 2, 1890, No. 56,830; in England November 8, 1890, No. 18,021, and in France November 19, 1890, No. 203,745.

*To all whom it may concern:*

Be it known that we, JOSEF MESSINGER and GEORG VORTMANN, subjects of the Emperor of Austria-Hungary, residing at Aix-la-Chapelle, and HERMANN JANSSEN, of Elberfeld, in the Kingdom of Prussia and Empire of Germany, doctors of philosophy, chemists, and assignors to the FARBENFABRIKEN, VORMALS FR. BAYER & CO., have invented a new and useful Improvement in the Manufacture of Pharmaceutical Products, (for which the said FARBENFABRIKEN have already obtained Letters Patent in Germany, No. 56,830, dated November 2, 1890; in England, No. 18,021, dated November 8, 1890, and in France, No. 203,745, dated November 19, 1890,) of which the following is a specification.

Our invention relates to a new pharmaceutical product different from that of the Letters Patent No. 446,875, dated February 24, 1891.

Our new product obtained by the action of iodine upon para-isobutyl-ortho-cresol in alkaline solution is of very great value as a real substitute for iodoform in medical practice.

For producing para-isobutyl-ortho-cresol iodide we proceed as follows: About 16.4 parts, by weight, of para-isobutyl-ortho-cresol, obtained by the reaction of isobutyl-alcohol upon ortho-cresol in the presence of chloride of zinc at 190° centigrade are dissolved in about sixteen parts, by weight, of caustic soda and five hundred parts, by weight, of water. This solution after having been cooled with ice to about 5° centigrade is allowed to flow under continuous stirring into a liquid obtained by dissolving 101.6 parts, by weight, of iodine in a watery solution of one hundred parts, by weight, of potassium iodide. A yellowish flaky amorphous precipitate immediately separates which is filtered off, purified by carefully washing with water and dried at ordinary temperature.

In place of the solution of iodine in alkaline iodide employed in the foregoing example such materials also can be used as set the iodine free, viz: solutions of alkaline iodides and chloride of lime (calcium hypochlorite) or other mixtures capable of producing the same effect.

Our new product forms a yellow slightly odorous powder which easily dissolves with the same color in ether, chloroform or olive oil, but difficultly in alcohol, benzene and ligroine. It does not dissolve in water and likewise not in caustic alkali. Owing to its insolubility in alkalies our new substance represents an iodine substitution product which contains the iodine in place of hydrogen of the hydroxyl group. When heated above 60° centigrade it commences to decompose, becomes darker and gradually melts together. On further heating iodine vapors develop.

Our new product differs from the thymol-iodine of the Letters Patent No. 446,875, dated February 24, 1891, as the latter substance represents a brown-red powder being only difficultly soluble in alcohol, more easily in ether and very readily soluble in oil. Differing from the substances described by Willgerodt and Kornblum (*Journal fur Practische Chemie* (2) 39, p. 289 to 298) which are soluble in alkali, our product does not dissolve in alkali.

Having now described the nature of our invention and in what manner the same is to be executed, what we claim as new, and desire to secure by Letters Patent, is—

1. The process of producing the new para-isobutyl-ortho-cresoliodide treating para-isobutyl-alpha-cresol in alkaline solution with iodine.

2. As a new manufacture the para-isobutyl-ortho-cresoliodide which forms a yellow powder, dissolves very readily in ether, chloroform and olive oil, difficultly in alcohol, benzene and ligroine and is insoluble in water and caustic alkalies and decomposing on heating above 60° centigrade and on further heating iodine vapors develop.

In testimony that we claim the foregoing as our invention we have signed our names in the presence of two subscribing witnesses.

JOSEF MESSINGER.
  GEORG VORTMANN.
  HERMANN JANSSEN.

Witnesses:
  D. J. PARTELLO,
  CARL DUNBERG.